(12) United States Patent
Kishi

(10) Patent No.: US 7,120,594 B2
(45) Date of Patent: Oct. 10, 2006

(54) MERCHANDISE CONTRACT BROKERAGE SYSTEM

(75) Inventor: Hiroyuki Kishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 464 days.

(21) Appl. No.: 09/815,058

(22) Filed: Mar. 23, 2001

(65) Prior Publication Data

US 2001/0039499 A1   Nov. 8, 2001

(30) Foreign Application Priority Data

May 2, 2000   (JP)  .............................. 2000-133885

(51) Int. Cl.
    *G06Q 30/00*   (2006.01)
(52) U.S. Cl. .......................................... 705/26; 705/28
(58) Field of Classification Search ................. D05/26; 705/40, 10, 26, 27, 28
    See application file for complete search history.

(56) References Cited

U.S. PATENT DOCUMENTS

| | | | |
|---|---|---|---|
| 5,128,861 A * | 7/1992 | Kagami et al. ................ 705/10 |
| 5,406,475 A | 4/1995 | Kouchi et al. |
| 5,666,493 A * | 9/1997 | Wojcik et al. ................. 705/26 |
| 6,167,378 A * | 12/2000 | Webber, Jr. .................... 705/8 |
| 6,324,522 B1 * | 11/2001 | Peterson et al. ............... 705/28 |
| 6,341,272 B1 * | 1/2002 | Randle ......................... 705/40 |

FOREIGN PATENT DOCUMENTS

| | | |
|---|---|---|
| JP | 05-307556 | 11/1993 |
| JP | 08129590 A * | 5/1996 |
| JP | 11-015880 | 1/1999 |

OTHER PUBLICATIONS

Hudgins-Bonafield, Christy: "Orchestrating Today's E-Commerce", Network Computing, 61, Sep. 6, 1999.*
Japanese Office Action issued Feb. 1, 2006 regarding Japanese Patent Application No. 2000-133885 (6 pgs.)

* cited by examiner

*Primary Examiner*—Jeffrey A. Smith
(74) *Attorney, Agent, or Firm*—Staas & Halsey LLP

(57) ABSTRACT

The present invention provides a merchandise contract brokerage system to which a plurality of merchandise vendor information processing systems, a plurality of retailer information processing systems, and a plurality of consumer information processing systems are connected via a network. This merchandise contract brokerage system includes a merchandise contract sub system that performs a brokerage operation in transmission and reception of merchandise information and contract information between the plurality of merchandise vendor information processing systems and the plurality of retailer information processing systems, and a retailer sub system that performs a brokerage operation in transmission and reception of merchandise information and contract information between the plurality of retailer information processing systems and the plurality of consumer information processing systems.

4 Claims, 5 Drawing Sheets

FIG.5

| vid | tpcode | tpname | attr | fname | cond |
|---|---|---|---|---|---|
|  |  |  |  |  |  |
|  |  |  |  |  |  |

FIG.6

| sid | tpcode | tpname | attr | fname | cond |
|---|---|---|---|---|---|
|  |  |  |  |  |  |
|  |  |  |  |  |  |

FIG.7

| vid | vaddr |
|---|---|
|  |  |
|  |  |

FIG.8

| sid | saddr |
|---|---|
|  |  |
|  |  |

MERCHANDISE CONTRACT BROKERAGE SYSTEM

BACKGROUND OF THE INVENTION

1. Field of the Invention

The present invention generally relates to business transaction systems, and, more particularly, to a business transaction system in which a merchandise vendor plans merchandise and displays the merchandise for retailers, and the retailers order the displayed merchandise from the merchandise vendor.

2. Description of the Related Art

Apparel makers and wholesalers hold shows or exhibitions when plans for the merchandise for each coming next season are completed. After the shows or exhibitions, the makers and wholesalers make contracts with retailers. Based on the contracts, the makers start manufacturing products. The retailers order and receive the products in accordance with the contracts made before the season. However, the retailers always take the risk of a smaller sales figure due to discounts caused by goods left unsold or a possibility of exhaustion of stock that spoils a greater business opportunity. A careless contract results in a huge amount of returned goods.

SUMMARY OF THE INVENTION

A general object of the present invention is to provide merchandise contract brokerage systems in which the above disadvantages are eliminated.

A more specific object of the present invention is to provide a merchandise contract brokerage system which reduces the number of goods left unsold that result in discounts and a smaller sales figure, and which also reduces the possibility of exhaustion of stock that hurts a greater business opportunity.

The above objects of the present invention are achieved by a merchandise contract brokerage system to which a plurality of merchandise vendor information processing systems, a plurality of retailer information processing systems, and a plurality of consumer information processing systems are connected via a network. This merchandise contract brokerage system of the present invention includes: a merchandise contract sub system that performs a brokerage operation in the transmission and reception of merchandise information and contract information between the plurality of merchandise vendor information processing systems and the plurality of retailer information processing systems; and a retailing sub system that performs a brokerage operation in the transmission and reception of merchandise information and contract information between the plurality of retailer information processing system and the plurality of consumer information processing system.

This merchandise contract brokerage system reduces the number of goods left unsold that result in discounts and a smaller sales figure, and also reduces the possibility of exhaustion of stock that hurts a greater business opportunity.

The above and other objects and features of the present invention will become more apparent from the following description taken in conjunction with the accompanying drawings.

BRIEF DESCRIPTION OF THE DRAWINGS

FIG. 5 shows the structure of a retailer merchandise information management table;

FIG. 6 shows the structure of a consumer merchandise information management table;

FIG. 7 shows the structure of a merchandise vendor information management table; and FIG. 8 shows the structure of a retailer information management table.

DESCRIPTION OF THE PREFERRED EMBODIMENTS

The following is a description of embodiments of the present invention, with reference to the accompanying drawings.

Figure 1:
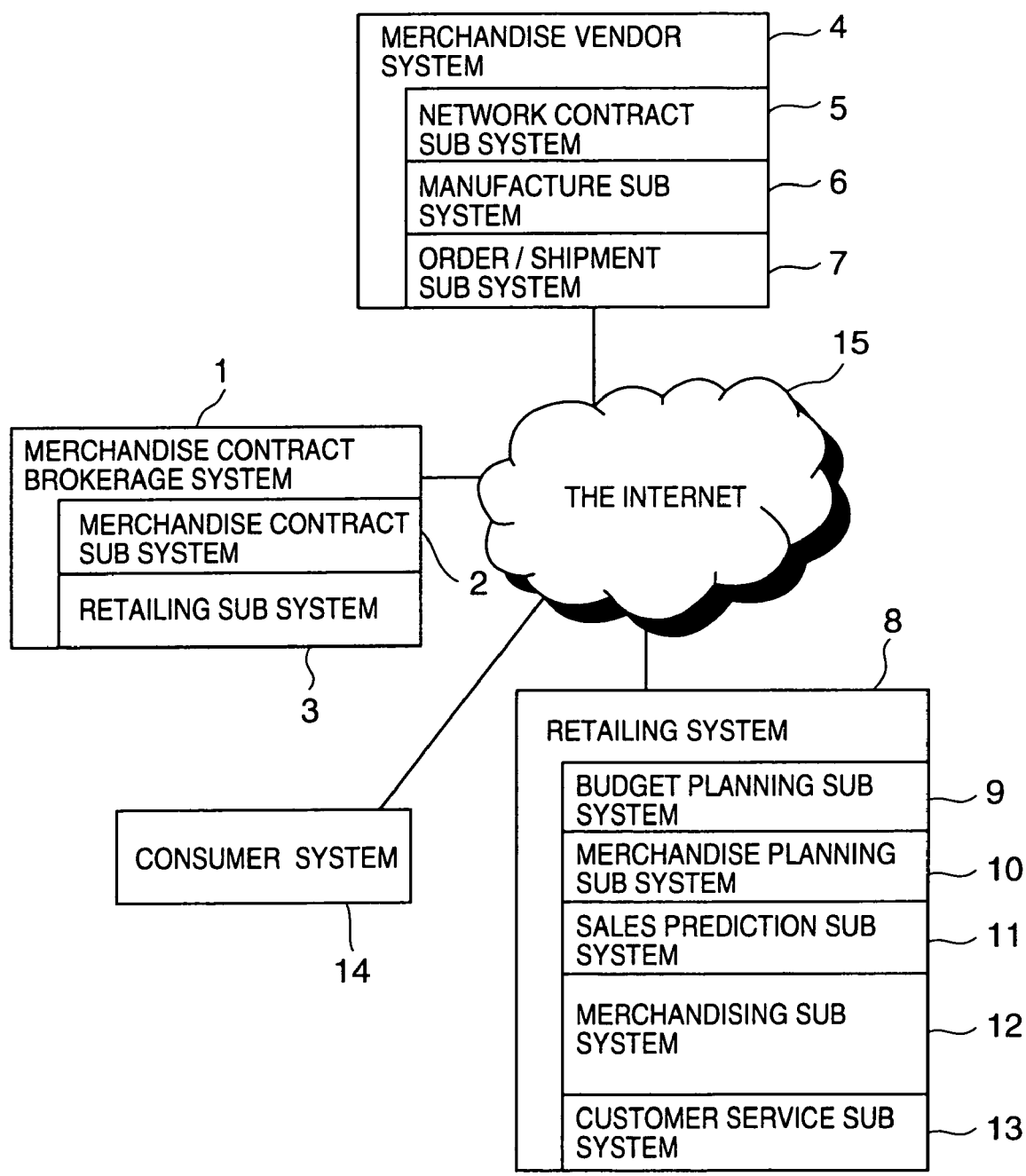
FIG. 1 shows the entire merchandise contract network in accordance with the present invention.

FIG. 1 shows the entire merchandise contract network to which the merchandise contract brokerage system of the present invention is applied. In FIG. 1, reference numeral 1 indicates a merchandise contract brokerage system that includes a merchandise contract sub system 2 and a retailer sub system 3.

Reference numeral 4 indicates a merchandise vendor system that includes a network contract sub system 5, a manufacture sub system 6, and an order/shipment sub system 7. The merchandise vendor system 4 is an information processing system that is run by a maker who provides merchandise or a wholesaler.

Reference numeral 8 indicates a retailing system that includes a budget planning sub system 9, a merchandise planning sub system 10, a sales prediction sub system 11, a merchandising sub system 12, and a customer service sub system 13. The retailing system 8 is an information processing system that is run by a retailer.

Reference numeral 14 indicates a consumer system that is an information processing system, such as a computer, used by general consumers. Reference numeral 15 indicates the Internet that connects the merchandise contract brokerage system 1 to a plurality of merchandise vendor systems 4, a plurality of retailing systems 8, and a plurality of consumer systems 14.

The network contract sub system 5 requests the merchandise contract sub system 2 to register merchandise information at the planning stage based on inputted merchandise plans. The network contract sub system 5 also analyzes contract information supplied from the merchandise contract sub system 2, and then sends the analysis results to the manufacture sub system 6.

The manufacture sub system 6 manufactures the planned merchandise in accordance with the analysis results supplied from the network contract sub system 5, and reports the manufacture conditions to the order/shipment sub system 7.

The order/shipment sub system 7 receives orders made by retailers, and conducts the shipment process in accordance with the manufacture conditions notified by the manufacture system 6.

The budget planning sub system 9 plans a budget in retailing, and notifies the merchandise planning sub system 10 of the budget plan.

The merchandise planning sub system 10 produces consumer merchandise information that contains the sales price and the planned starting data of sales as sale information, based on retailer merchandise information registered in the merchandise contract sub system 2 and a budget plan notified by a budget planning system. The consumer merchandise information is registered in the retailing sub system 3. The merchandise planning sub system 10 also notifies the merchandise contract sub system 2 of contract information for merchandise vendors.

The sales prediction sub system 11 predicts the sales of planned merchandise based on contract information for retailers supplied from the retailing sub system 3, and notifies the merchandising sub system 12 of the order information. The sales prediction sub system 11 also notifies the merchandise contract sub system 2 of a change in contract decided by the merchandise planning sub system 10, if necessary.

The merchandising sub system 12 places an order on the order/shipment sub system 7 based on order information supplied from the sales prediction sub system 11. The merchandising sub system 12 also manages new arrivals and notifies the customer service sub system 13 of the new arrival information.

The customer service sub system 13 sends new merchandise arrival information supplied from the merchandising sub system 12 to the consumer system 14 via e-mail.

Figure 2:
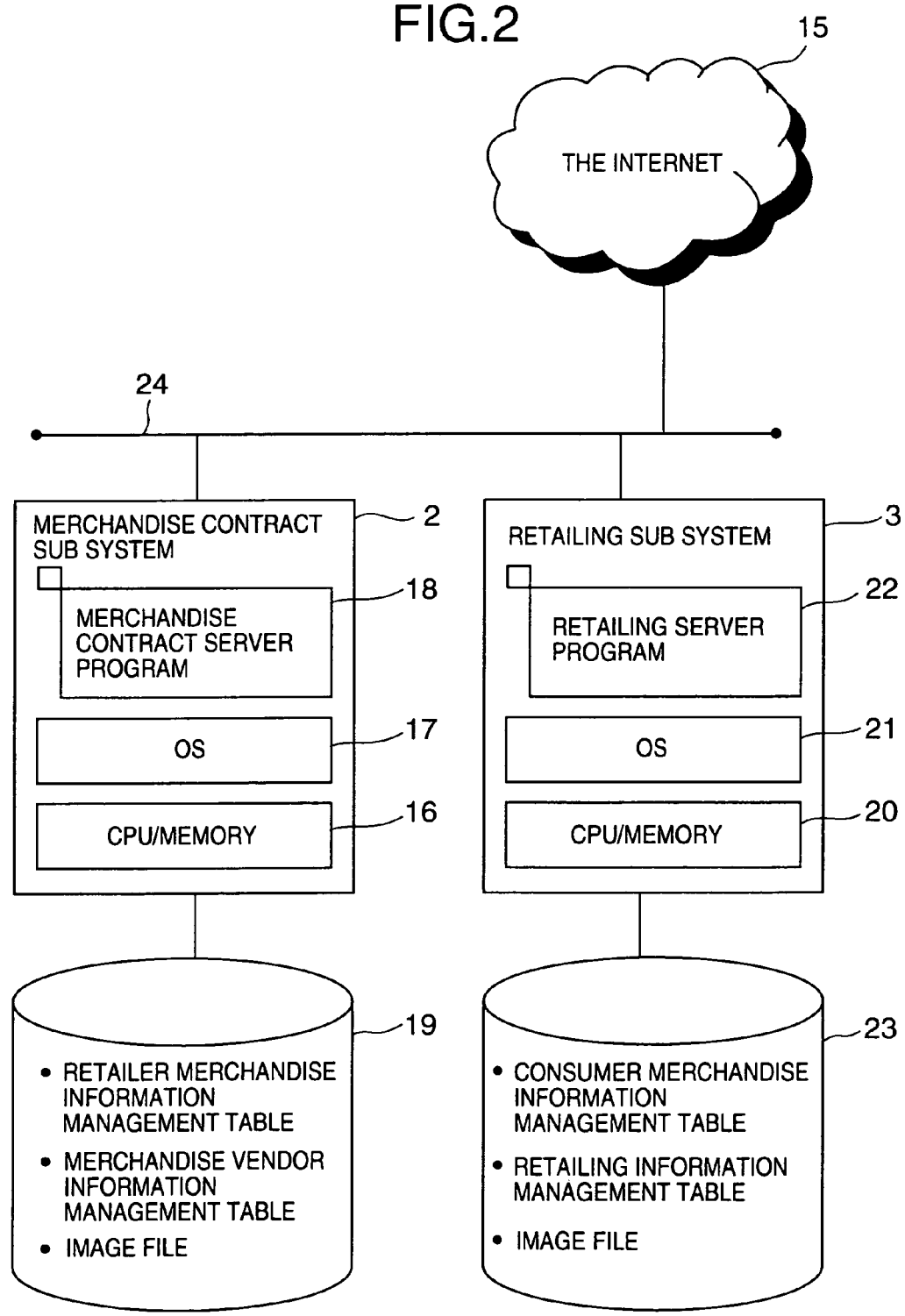
FIG. 2 shows the structure of a merchandise contract brokerage system.

As shown in FIG. 2, the merchandise contract brokerage system 1 comprises the merchandise contract sub system 2 and the retailing sub system 3 connected to each other via a LAN 24.

The merchandise contract sub system 2 is realized by a merchandise contract server program 18 that is executed under the control of an OS (operating system) 17 in a computing system provided with a CPU/memory 16. The merchandise contract server program 18 is temporarily stored in an external storage device 19 via a removable recording medium such as a floppy disk or a CD-ROM or via a network, and then loaded into a memory for execution.

Besides the merchandise contract server program 18, the external storage device 19 stores a retailer merchandise information management table, a merchandise vendor information management table, and a plurality of image files.

FIG. 5 shows the structure of the retailer merchandise information management table, which consists of six items of "vid", "tpcode", "tpname", "attr", "fname", and "cond".

The item "vid" is merchandise vendor identifying information for identifying a merchandise vendor that provides the merchandise.

The item "tpcode" is a temporary merchandise code that the merchandise vendor allocates to the merchandise.

The item "tpname" is a temporary name that the merchandise vendor allocates to the merchandise.

The item "attr" is the attributes of the merchandise. For instance, the attributes include the color, size, material, performance, and all the other attributes of the merchandise.

The item "fname" is the name of the file that stores the image data (of a photograph or a drawing) of the merchandise.

The item "cond" is the sales conditions of the merchandise, including the retail price desired and the starting sales date (shipment date).

FIG. 7 shows the structure of the merchandise vendor information management table, which consists of two items, "vid" and "vaddr".

The item "vid" is merchandise vendor identifying information. The item "vaddr" is a contract information transmission address that is the address to which the contact information for the merchandise vendor system 4 is sent. Such a contract information transmission address may be an e-mail address.

Figure 3:
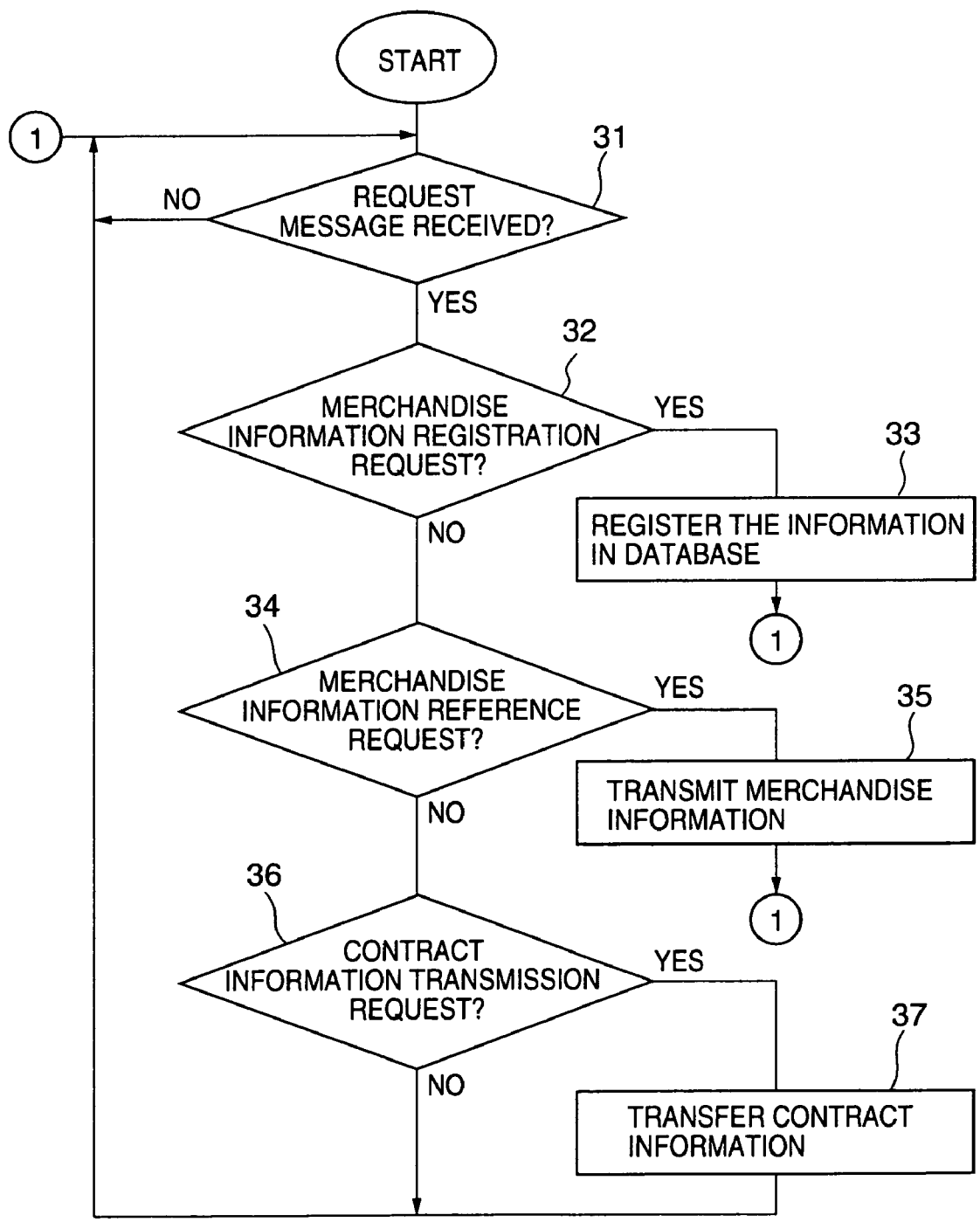
FIG. 3 illustrates an operation of a merchandise contract server program.

FIG. 3 shows an operation according to the merchandise contract server program 18.

In step 31, the merchandise contract server program 18 waits for various request messages sent from the merchandise vendor system 4 or the retailing system 8.

The request messages to be processed by the merchandise contract server program 18 include three types of request messages: a retailer merchandise information registration request, a retailer merchandise information reference request, and a merchandise vendor contract information transmission request.

The retailer merchandise information registration request message from the merchandise vendor system 4 includes merchandise vendor identifying information, a temporary merchandise code, a temporary merchandise name, merchandise attributes, an image of the merchandise, and sales conditions.

The retailer merchandise information reference request message sent from the retailing system 8 includes a temporary merchandise code.

The merchandise vendor contract information transmission request message sent from the retailing system 8 includes retailer identifying information for identifying the retailer that is one of the contracting parties, merchandise vendor identifying information for identifying the merchandise vendor that is the other contracting party, a temporary merchandise code of the merchandise under contract, the number of contracts, and the conditions of contract.

In step 32, it is determined whether or not the received request message is the retailer merchandise information registration request message sent from the merchandise vendor system 4. If the received request message is the retailer merchandise information registration request message sent from the merchandise vendor system 4, the operation moves on to step 33, and, if not, the operation moves on to step 34.

In step 33, the file name of an image file for storing the image of the merchandise is produced, and the image of the merchandise is stored under the produced file name. The merchandise vendor identifying information, the temporary merchandise code, the temporary merchandise name, the merchandise attributes, the file name are stored on the same record in the retailer merchandise information management table.

After the completion of the above process, the operation returns to step 31 to wait again for a request message.

In step 34, it is determined whether or not the received request message is the retailer merchandise information reference request message sent from the retailing system 8. If the received request message is the retailer merchandise information reference request message sent from the retailing system 8, the operation moves onto step 35, and, if not, the operation moves on to step 36.

In step 35, if the retailer merchandise information reference request is a reference request for specified merchandise, i.e., if the temporary merchandise code is specified, the entire information recorded on the corresponding record in the retailer merchandise information management table corresponding to the specified merchandise and the image of the merchandise are transmitted to the retailing system 8, which has made the request. If the retailer merchandise information reference request is not a reference request for specified merchandise, the information of all the records in the retailer merchandise information management table are transmitted to the retailing system 8, which has made the request.

After the completion of the above process, the operation returns to step 31 to wait for another request message.

In step 36, it is determined whether or not the received request message is the merchandise vendor contract information transmission request message sent from the retailing system 8. If the received request message is the merchandise vendor contract information transmission request message, the operation moves on to step 37, and, if not, the operation returns to step 31 to wait for another request message.

In step 37, the merchandise vendor identifying information is extracted from the merchandise vendor contract information transmission request message. Based on the extracted merchandise vendor identifying information, the corresponding contract information address is detected from the merchandise vendor management information table. The contents of the merchandise vendor contract information transmission request message are transferred to the detected contract information transmission address.

After the completion of the above process, the operation returns to step 31 to wait again for another request message.

Next, the retailing sub system 3 will be described.

The retailing sub system 3 is realized by a retailing server program 22 executed under the control of an OS (operation system) 21 in a computing system that includes a CPU/memory 20. The retailing server program 22 is temporarily stored in an external storage device 23 via a removable storage medium, such as a floppy disk or a CD-ROM, or a network. The retailing server program 22 is then loaded in the memory and executed.

Besides the retailing server program 22, the external storage device 23 stores the consumer merchandise information management table, the retailer information management table, and a plurality of image files.

FIG. 6 shows the structure of the consumer merchandise information management table, which consists of six items of "sid", "tpcode", "tpname", "attr", "fname", and "cond".

The item "sid" is retailer identifying information for identifying the retailer.

The item "tpcode" is a temporary merchandise code that the merchandise vendor allocates to the merchandise.

The item "tpname" is a temporary merchandise name that the merchandise vendor allocates to the merchandise.

The item "attr" is the attributes of the merchandise, which include the color, the size, the material, the performance of the merchandise.

The item "fname" is the file name of the file that stores the image data (of a photograph or a drawing) of the merchandise.

The item "cond" is the sales conditions, which include the planned same price or sales starting date of the merchandise.

FIG. 8 shows the structure of the retailer information management table, which consists of two items, "sid" and "saddr".

The item "sid" is the retailer identifying information. The item "saddr" is a contract information transmission address to which the contract information for the retailing system 8 is transmitted. The contract information transmission address may be an e-mail address.

Figure 4:
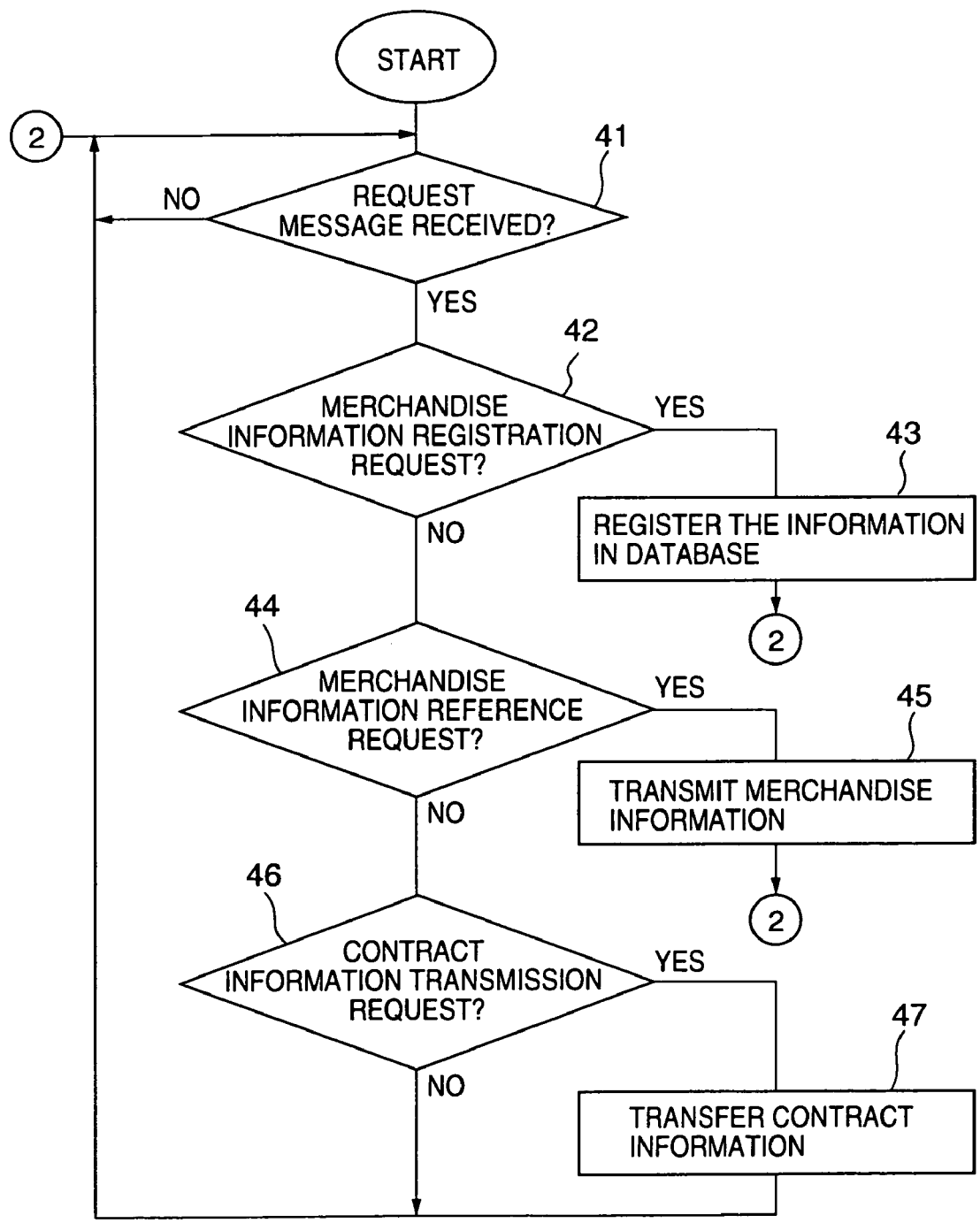
FIG. 4 illustrates a operation of a retailing server program.

FIG. 4 illustrates an operation of the retailing server program 22.

In step 41, the retailing server program 22 waits for various request messages from the retailing system 8 or the consumer system 14.

The request messages to be processed by the retailing server program 22 include three types of request messages: a consumer merchandise information registration request message, a consumer merchandise information reference request message, and a retailer contract information transmission request message.

The consumer merchandise information registration request message contains retailer identifying information, a temporary merchandise code, a temporary merchandise name, merchandise attributes, an image of the merchandise, and sales conditions.

The consumer merchandise information reference request message is formed by the temporary merchandise code.

The retailer contract information transmission request message contains consumer identifying information for identifying a consumer whose one of the contracting parties, the retailer identifying information for identifying the retailer who is the other contracting party, the temporary merchandise code that indicates the merchandises to be traded, and the number of purchase orders.

In step 42, it is determined whether or not the received request message is the consumer merchandise information registration request message sent from the retailing system 8. If the received request message is the consumer merchandise information registration request message sent from the retailing system 8, the operation moves on to step 43, and, if not, the operation moves on to step 44.

In step 43, the file name of the image file for storing the image of the merchandise is produced, and the image of the merchandise is stored under the produced file name. The retailer identifying information, the temporary merchandise code, the temporary merchandise name, the attributes of the merchandise, the file name, the planned sales price, the planned sale starting date are stored in the same record in the consumer merchandise information management table.

After the completion of the above process, the operation returns to step 41 to wait again for another request message.

In step 44, it is determined whether or not the received request message is the consumer merchandise information reference request message sent from the consumer system 14. If the received request message is the consumer merchandise information reference request message sent from the consumer system 14, the operation moves on to step 45, and, if not, the operation moves on to step 46.

In step 45, if the consumer merchandise information reference request is a reference request for specified merchandise, i.e., if the retailer identifying information and the temporary merchandise code are specified, all the information of the records in the consumer merchandise information management table corresponding to the merchandise and the image of the merchandise are transmitted to the consumer system 14 that has made the request. If the retailer identifying information and the temporary merchandise code are not specified, the information of all the records in the consumer merchandise information management table are transmitted to the consumer system 14 that has made the request.

After the completion of the process, the operation returns to step 41 to wait again for another request message.

In step 46, it is determined whether or not the received request message is the retailer contract information transmission request message sent from the consumer system 14. If the received request message is the retailer contract information transmission request message, the operation moves on to step 47, and, if not, the operation returns to step 41 to wait again for another request message.

In step 47, the retailer identifying information is extracted from the retailer contract information transmission request message. Based on the extracted retailer identifying information, the corresponding contract information transmission address is detected from the retailer information management table, and the contents of the retailer contract information transmission request message are transferred to the detected contract information transmission address.

After the completion of the above process, the operation returns to step 41 to wait again for another request message.

Modifications can be made to the above embodiment of the present invention.

For instance, the network that connects the merchandise contract brokerage system to the merchandise vendor system, the retailing system, and the consumer system, may be a private line.

The merchandise contract sub system and the retailer sub system may be embodied on the same computer.

The merchandise vendor identifying information may be the e-mail address that is also used as the contract information transmission address. In such a case, there is no need to search the merchandise vendor information management table, when the merchandise contract information is transferred.

The retailer identifying information may be the e-mail address that is also used as the contract information transmission address. In such a case, there is no need to search the retailer information management table, when the retailer contact information is transferred.

The present invention is not limited to the specifically disclosed embodiments, but variations and modifications may be made without departing from the scope of the present invention.

The present application is based on Japanese priority application No. 2000-133885, filed on May 2, 2000, the entire contents of which are hereby incorporated by reference.

What is claimed is:

1. A merchandise contract brokerage system to which a plurality of merchandise vendor information processing systems, a plurality of retailer information processing systems, and a plurality of consumer information processing systems are connected via a network, said merchandise contract brokerage system comprising:

a merchandise contract sub system that performs a brokerage operation in transmission and reception of merchandise information and contract information between the plurality of merchandise vendor information processing systems and the plurality of retailer information processing systems; and a retailing sub system that performs a brokerage operation in transmission and reception of merchandise information and contract information between the plurality of retailer information processing systems and the plurality of consumer information processing systems, said retailing sub system including a retailing server program adapted to process a consumer merchandise information registration request message, a consumer merchandise information reference request message, and a retailer contract information transmission request message;

wherein the merchandise contract sub system transmits retailer merchandise information to one of the plurality of retailer information processing systems in response to a request from the one of the plurality of retailer information processing systems, and transmits merchandise vendor contract information to one of the plurality of merchandise vendor information processing systems in response to a request from one of the plurality of retailer information processing systems; and wherein the retailing sub system transmits consumer merchandise information to one of the plurality of consumer information processing systems in response to a request from the one of the plurality of consumer information processing systems, and transmits retailer contract information to one of the plurality of retailer information processing systems in response to a request from one of the plurality of consumer information processing systems.

2. The merchandise contract brokerage system as claimed in claim 1, wherein the merchandise contract sub system comprises:

a first information storage unit that stores information;

a retailer merchandise information registration unit that registers retailer merchandise information in the first information storage unit in response to a request from one of the plurality of merchandise vendor information processing systems;

a retailer merchandise information transmission unit that transmits the retailer merchandise information from the first information storage unit to one of the plurality of retailer information processing systems, in response to a request from the one of the plurality of retailer information processing systems; and a merchandise vendor contract information transmission unit that transmits merchandise vendor contract information to one of the plurality of merchandise vendor information processing systems in response to a request from one of the plurality of retailer information processing systems, and the retailing sub system comprises:

a second information storage unit that stores information;

a consumer merchandise information registration unit that registers consumer merchandise information in the second information storage unit in response to a request from one of the plurality of retailer information processing systems;

a consumer merchandise information transmission unit that transmits the consumer merchandise information from the second information storage unit to one of the plurality of consumer information processing systems, in response to a request from the one of the plurality of consumer information processing systems; and a retailer contract information transmission unit that transmits retailer contract information to one of the plurality of retailer information processing system, in response to a request from one of the plurality of consumer information processing systems.

3. A merchandise contract sub system which performs a brokerage operation in transmission and reception of merchandise information and contract information between a plurality of merchandise vendor information processing systems and a plurality of retailer information processing systems, said merchandise contract sub system comprising:

an information storage unit that stores information;

a retailer merchandise information registration unit that registers retailer merchandise information in the information storage unit in response to a request from one of the plurality of merchandise vendor information processing systems;

a retailer merchandise information transmission unit that transmits the retailer merchandise information from the information storage unit to one of the plurality of retailer information processing systems, in response to a request from the one of the plurality of retailer information processing systems;

a merchandise contract server program adapted to process a retailer merchandise information registration request, a retailer merchandise information reference request, and a merchandise vendor contract information transmission request; and a merchandise vendor contract information transmission unit that transmits merchandise vendor contract information to one of the plurality of merchandise vendor information processing systems in response to a request from one of the plurality of retailer information processing systems.

4. A retailing sub system that performs a brokerage operation in transmission and reception of merchandise information and contract information between a plurality of retailer information processing systems and a plurality of consumer information processing systems, said retailing sub system comprising:

an information storage unit that stores information;

a consumer merchandise information registration unit that registers consumer merchandise information in the information storage unit in response to a request from one of the plurality of consumer information processing systems;

a consumer merchandise information transmission unit that transmits the consumer merchandise information from the information storage unit to one of the plurality of consumer information processing systems, in response to a request from the one of the plurality of consumer information processing systems; and a retailer contract information transmission unit that transmits retailer contract information to one of the plurality of retailer information processing system, in response to a request from one of the plurality of consumer information processing systems; and a retailing server program adapted to process a consumer merchandise information registration request message, a consumer merchandise information reference request message, and a retailer contract information transmission request message.

* * * * *